ACTIVE PHASE SHIFT COMPENSATION NETWORK

Filed April 2, 1964 2 Sheets-Sheet 1

INVENTOR.
RAYMOND T. MATSUMOTO
BY A. M. Fernandez
ATTORNEY

INVENTOR.
RAYMOND T. MATSUMOTO

BY A. M. Fernandez

ATTORNEY

United States Patent Office 3,319,079

Patented May 9, 1967

3,319,079

ACTIVE PHASE SHIFT COMPENSATION NETWORK

Raymond T. Matsumoto, Cypress, Calif., assignor to North American Aviation, Inc.

Filed Apr. 2, 1964, Ser. No. 356,863
1 Claim. (Cl. 307—88.5)

This invention relates to an active compensation network, and more particularly to an active two-port network for phase shift compensation.

In many circuits, it is often desirable to provide compensation networks in order to realize desired gain and phase shift or stability characteristics. If an active network is connected in series with a passive network for that purpose, the gain of the active element is not decreased as frequency increases and the passive network generally decreases the overall circuit gain without increasing the bandwidth of the active element.

An object of this invention is to provide an active compensation network with the gain of the active element decreasing as frequency is increased.

Another object is to provide an active compensation network in which the phase shift characteristics of the active element need not be considered. A related object is to provide a network which may readily be employed to selectively introduce poles and zeros in the $s$ plane to reshape the response of a circuit.

These and other objects of the invention are achieved by incorporating phase shift networks around a transistor, thereby requiring less gain from the transistor as frequency is increased. The phase shift networks comprise a shunt impedance connected to the base of the transistor, and a series impedance connected to the emitter of the transistor.

Other objects and advantages of the invention will become apparent from the following detailed description with reference to the drawings in which.

Figure 1:
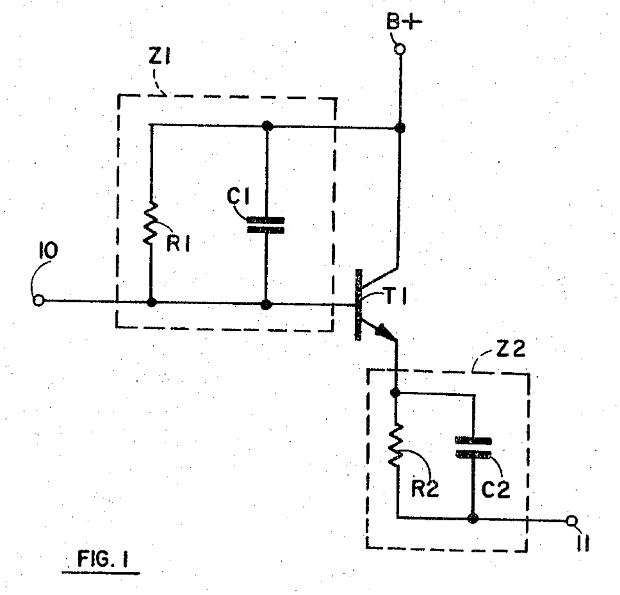
FIG. 1 is a circuit diagram of an active two-port network in accordance with the invention.

The invention illustrated in FIG. 1 comprises a transistor $T_1$ and two impedance networks $Z_1$ and $Z_2$. The network $Z_1$ is connected in shunt to the input terminal 10 to which the base of the transistor is connected, and the network $Z_2$ is connected in series between an output terminal 11 and the emitter of the transistor. In practice, the output terminal 11 may be connected to a source of potential, or ground, and the output taken from the collector of the transistor $T_1$. In either case it is preferred to drive a low impedance load, such as the emitter of a grounded base transistor or the base of a grounded emitter stage having a large voltage gain.

Each impedance network includes a resistor in parallel with a capacitor. In the shunt impedance $Z_1$, a resistor $R_1$ and a capacitor $C_1$ provide a negative phase shift at frequencies determined primarily by the product $R_1C_1$, while in the series impedance $Z_2$, a resistor $R_2$ and a capacitor $C_2$ provide a positive phase shift at frequencies determined primarily by the product $R_2C_2$. If $R_1C_1$ is greater than $R_2C_2$, a negative phase shift is produced by the circuit at low frequencies; but as frequency increases, a positive phase shift is produced. Accordingly, if $R_1C_1$ is greater than $R_2C_2$, a lag-lead compensation network is provided. Similarly, if $R_2C_2$ is greater than $R_1C_1$, a lead-lag compensation network is provided.

The current gain of the circuit at low frequencies is determined primarily by the ratio $R_1/R_2$ of the resistors. At higher frequencies, the gain is determined primarily by the ratio $C_2/C_1$ of the capacitors. If the capacitors are equal, the gain at high frequencies is equal to unity.

As frequency increases the current gain required of the transistor decreases if $$\frac{R_1}{R_2}<\frac{C_2}{C_1}$$

and its bandwidth (the frequency at which the transistor introduces phase shift) is increased. It will be noted with reference to FIG. 3 that the bandwidth of the transistor $T_1$ need not be considered in the design of a feedback loop if the cutoff frequency of the other transistors is within that band width.

The impedance network $Z_1$ should be designed to provide an impedance which decreases with frequency increase so that the transfer of energy from a current source at the input terminal 10 to the transistor base decreases in order that the design of the impedance network $Z_2$ be easier to design for a given application. However, that is not essential. The impedance network $Z_2$ is then designed to compensate for the phase shift introduced by $Z_1$. Its magnitude may decrease with frequency, but it should be greater than, or equal to, the magnitude of the impedance network $Z_1$ at higher frequencies in order to attenuate the current gain.

Although all design considerations which may be encountered in different applications could not be expected to fall within one general rule, or set of general rules, it is believed that the foregoing considerations will enable one skilled in the art to use the circuit of FIG. 1 to advantage by using standard design techniques, such as judicially locating the poles and zeros in the $s$ plane.

A particular advantage of this invention is that in any application, the pole-zero location of the circuit in which it is employed for compensation may be very well controlled. Some of its other important characteristics are that at low frequencies current gain depends on the value of the resistors $R_1$ and $R_2$ and there is negligible phase shift in the current gain, while at high frequencies the current gain depends upon the value of the capacitors $C_1$ and $C_2$ and phase shift may be made negligible for frequencies within the pass band of the overall circuit.

As noted hereinbefore, if the time constant of the impedance network $Z_1$ is greater than that of the impedance network $Z_2$, the overall circuit provides lag-lead compensation; if the opposite is true, the circuit provides lead-lag compensation. It differs from a passive lag-lead or lead-lag network because it introduces gain. The gain is determined by the ratio $R_1/R_2$ within the pass-band of the circuit. It also differs from the combination of a transistor in series with a passive compensating network in that it decreases the gain of the transistor $T_1$.

The pole-zero location introduced by the circuit (as determined by the impedance networks $Z_1$ and $Z_2$) is preferably placed at a frequency lower than the bandwidth of the transistor $T_1$ for lag-lead compensation so that the phase shift of the transistor $T_1$ need not be considered in the overall transfer function for frequencies less than that frequency F which is proportional to $C_1$ times the upper bandwidth frequency of the transistor divided by $C_2$. Thus with a judicious choice of capacitors $C_1$ and $C_2$, a lag-lead compensation circuit is readily provided with attenuation at high frequencies and no phase shift at frequencies below the frequency F. It is also possible to provide a lead-lag network in a similar manner with only some loss of overall bandwidth.

Figure 2:
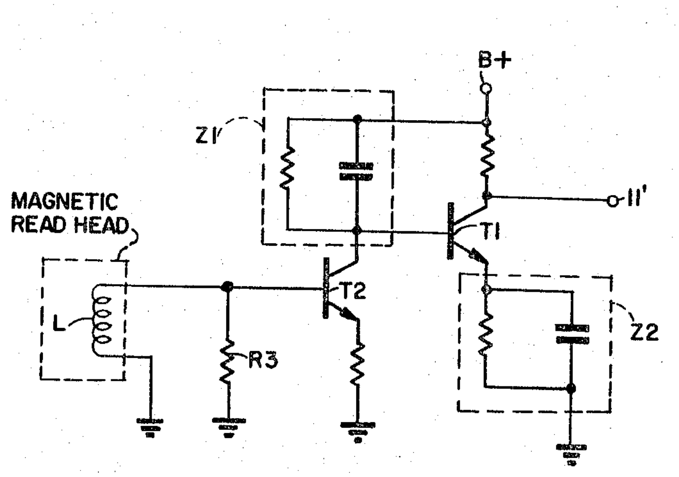
FIG. 2 is a diagram of a circuit illustrating one advantageous application of the invention.

As noted hereinbefore, a major advantage of the invention is that it may be used to introduce a pole and a zero to reshape the response of a circuit. FIG. 2 illustrates that advantage in a practical application.

In a magnetic disc, drum or tape memory system, the output voltage signal is dependent upon the load. In some instances, it is desirable to have as a load a low input impedance amplifier, but such a low impedance load distorts the output signal because of the high $L/R$ time constant introduced by the low input impedance connected to the relatively high inductance of the read head. For instance, if the input impedance is assumed to be $R_3$ as shown in FIG. 2, the voltage appearing at the base of an amplifier transistor $T_2$ is:

$$\frac{eR_3}{R_3+SL}=\frac{eR_3}{L\left(S+\frac{R_3}{L}\right)} \qquad (1)$$

Because of the high $L/R_3$ time constant, the network response will be distorted. To compensate for that distortion of the signal at the base of the transistor $T_2$, the compensation circuit of FIG. 1 is provided where $Z_2$ is employed to cancel the pole $R_3/L$ of Equation 1, and $Z_1$ is employed to introduce a new pole at a higher frequency. The voltage signal at the output terminal 11' connected to the collector of the transistor $T_1$ is the same as if the input impedance of the amplifier $T_2$ were higher than $R_3$. In that manner a read amplifier without distortion due to a low input impedance may be readily provided. As noted hereinbefore, the output may be taken from either the emitter or the collector of the transistor $T_1$. In either case, it is preferable to drive a low impedance load such as the base of a grounded emitter stage with a large voltage gain.

Figure 3:
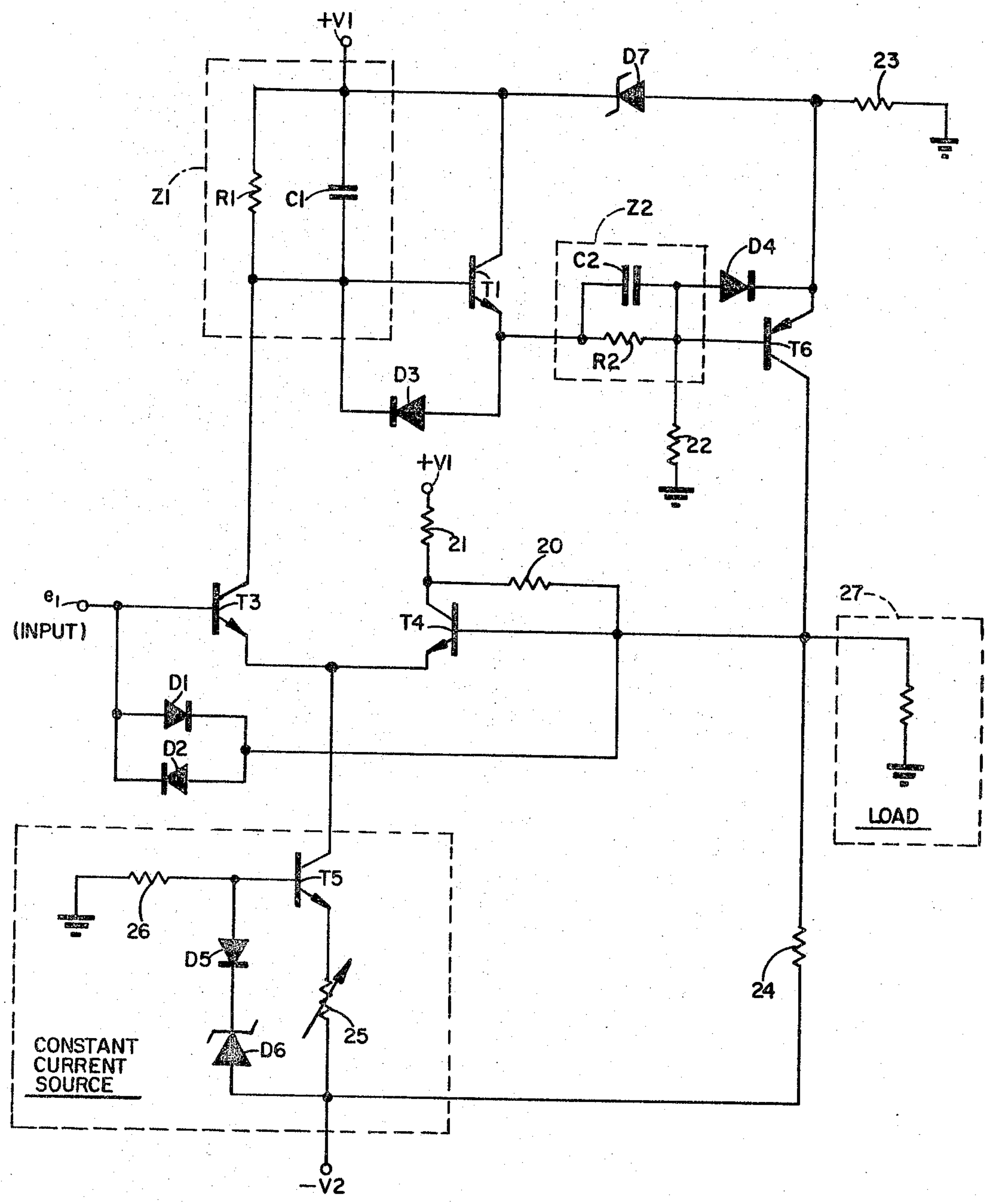
FIG. 3 is a diagram of a circuit illustrating another advantageous application of the invention.

FIG. 3 is a special buffer amplifier circuit illustrating the advantageous application of the invention in a feedback amplifier. Most amplifiers are built with a passive series feedback network. If an active element is provided in the feedback loop, it is connected in series with the passive network. In the circuit of FIG. 3, the feedback network decreases the gain of the active element $T_1$ and introduces negligible phase shift at high frequencies below F, the frequency defined hereinbefore with reference to FIG. 1. Also, by decreasing the gain of the active element $T_1$, a wider band of frequencies for which the active element introduces negligible phase shift is achieved by a simple design.

The characteristics of this special amplifier include high input impedance greater than 4 megohms at low frequencies, made possible by amplifying the current of an input transistor $T_3$ by transistors $T_1$ and $T_6$, and coupling that current through transistor $T_4$ to transistor $T_3$.

The bandwidth of the overall feedback amplifier circuit may be readily designed with a bandwidth greater than 500 kc. for small signals and gain may also be readily adjusted with a minimum of design effort. The feedback network for stabilization, which includes the compensation network of FIG. 1 and resistors 20 and 21, allows the transistors $T_6$ and $T_4$ to introduce phase shifts at frequencies which will not affect stability. The compensation network is especially important in that regard in that it introduces gain at low frequencies and no gain or phase shift at high frequencies.

The transistors $T_3$ and $T_4$ are preferably matched to enable the difference between the input and output signals to be adjusted to zero. If a low-impedance signal source is provided, the amplifier is capable of translating a signal change from −10 volts to +10 volts within three microseconds with a maximum current input at the base of the transistor $T_3$ of 10 microamperes direct current. The components of a typical design are as follows:

| | | |
|---|---|---|
| $T_1$ | | 2N709 |
| $T_3$, $T_4$ | | 2N2060 |
| $T_5$ | | 2N1613 |
| $R_1$ | | 22K |
| $R_2$ | | 2.2K |
| $C_1$ | pf | 68 |
| $C_2$ | pf | 68 |
| Resistor **20** | | 22K |
| Resistor **21** | | 33K |
| Resistor **22** | | 17K |
| Resistor **23** | | 3.3K |
| Resistor **24** | | 3.9K |
| Resistor **25** | | 20K |
| Resistor **26** | | 13K |
| Load **27** | | 8K |
| Diodes $D_1$ to $D_5$ | | 1N916 |
| Zener diodes $D_6$, $D_7$ | | 1N753 |
| $+V_1$ | v | (+)24 |
| $-V_2$ | v | (−)24 |

A tolerance of ±10% is preferred for the power supplies and ±5% for all resistors. Diodes $D_1$ to $D_4$ are provided to protect the base emitter junctions of the transistors $T_3$, $T_4$, $T_1$ and $T_6$. The diodes $D_5$ and $D_6$ bias the transistor $T_5$ to provide a constant current and the diode $D_7$ is provided to limit the collector to emitter voltage of the transistor $T_1$. It also keeps the emitter of the transistor $T_6$ at a constant potential with respect to the potential $+V_1$.

The high impedance buffer amplifier provides negligible difference between input and output signals with a wide bandwidth, large signal response. These two characteristics are difficult to achieve, but were here easily achieved with the stabilizing network of FIG. 1.

The transfer function $T(s)$ of that stabilizing lag-lead network, which is the ratio of $I_2$ to $I_1$, is given by $$\frac{I_2}{I_1}=\frac{1}{\frac{1}{B_o}+\frac{S}{\omega_t}+\frac{k(R_1C_1S+1)}{R_2C_2S+1}} \qquad (2)$$

where:

$I_1$=input current to the base of the transistor $T_1$
$I_2$=output current to the base of the transistor $T_6$, assuming it is connected to ground
$B_o$=low frequency current gain of the transistor $T_1$
$\omega_t$=gain-bandwidth product in radians
$S$=complex frequency variable
$k=R_2/R_1$ If $$\frac{s}{\omega_t}<<\frac{k(R_1C_1S+1)}{(R_2C_2S+1)} \qquad (3)$$

$$\frac{I_2}{I_1}=\frac{B_o(1+R_2C_2S)}{(1+B_{ok})\left[\frac{1+R_2(C_2+B_oC_1)S}{1+B_{ok}}\right]} \qquad (4)$$

and the low frequency gain is:

$$\frac{I_2}{I_1}=\frac{B_o}{1+B_{ok}} \qquad (5)$$

while the high frequency gain is:

$$\frac{I_2}{I_1}=\frac{B_oC_2}{C_2+B_oC_1} \qquad (6)$$

From Equations 5 and 6, it may be seen that at low frequencies, gain is greater than 1 if $k$ is less than $B_o-1/B_o$. It may also be seen that there is no phase shift at low frequencies. At high frequencies, gain may be made less than 1 if $C_2$ is less than or equal to $C_1$. And finally, it may be noted from Equations 5 and 6 that the pole-zero location of the network may be readily controlled.

If the inequality of Equation 3 is defined by the expression $$\frac{10S}{\omega_t}\leq k\frac{(R_1C_1S+1)}{(R_2C_2S+1)} \qquad (7)$$

and the low frequency value of the right-hand side of that expression is $k$, then if $C_1<kC_2$, the right-hand side of that expression increases in magnitude with frequency to the maximum value of $C_1/C_2$; but if $C_1<kC_2$, the right-hand side of that expression decreases to the value $C_1/C_2$ as frequency increases. When $C_1=kC_2$, the right-hand side of that expression remains at the value $k$ for all frequencies and the transfer function defined by Equation 2 becomes independent of $C_1$ and $C_2$. If $C_1$ is greater than $kC_2$, a phase lag and then a phase lead occurs as frequency is increased.

If the frequency of the signal being translated is high enough so that the Equation 7 approaches $C_1/C_2$, the transfer function defined by Equation 4 is accurate for either lag-lead or lead-lag compensation as long as $$s \leq \left(\frac{C_1}{C_2}\right)\frac{\omega_t}{10}$$

Thus, within the pass-band of the transistor $T_1$, a very stable, well-controlled pole-zero configuration with gain may be realized in an active compensation network with a transistor having a large gain-bandwidth product.

It is to be understood that the applications of the invention described with reference to FIGS. 2 and 3 are only illustrative. Numerous other applications may be devised by those skilled in the art. The appended claim is therefore intended to cover the invention in its broadest aspects without regard to specific applications, environments or operating requirements.

What is claimed is:

An active, two-port compensation network having a transfer function $T(s)$, comprising:

a transistor having a base, emitter and collector, and having a low frequency current gain $B_o$, a shunt impedance $Z_1$ connected to the base of said transistor consisting of a resistor $R_1$ in parallel with a capacitor $C_1$, a series impedance $Z_2$ connected to the emitter of said transistor consisting of a resistor $R_2$ in parallel with a capacitor $C_2$, in which $$T(s)=\frac{1}{\frac{1}{B_o}+\frac{S}{\omega_t}+\frac{k(R_1C_1S+1)}{(R_2C_2S+1)}}$$

where S is a complex frequency variable and $\omega_t$ is the gain bandwidth product of said transistor in radians said $R_1C_1$ combination is selected for decreasing the impedance between said base and ground as the frequency of an input signal increases, and said $R_2C_2$ combination is selected for decreasing the impedance between said emitter and ground as the frequency of an input signal increases, said $R_2C_2$ combination having an impedance which is relatively higher than the $R_1C_1$ combination at the relatively higher frequencies.

References Cited by the Examiner

UNITED STATES PATENTS

| | | | |
|---|---|---|---|
| 2,885,495 | 5/1959 | Sziklai et al. | 330—21 X |
| 2,914,682 | 11/1959 | Taylor | 307—88.5 |
| 2,996,683 | 8/1961 | Lefkowitz | 330—21 |
| 3,148,285 | 9/1964 | Tedeschi et al. | 307—88.5 |
| 3,205,455 | 9/1965 | Gunn et al. | 332—18 |
| 3,210,681 | 10/1965 | Rhodes | 330—21 X |

ARTHUR GAUSS, *Primary Examiner.*

J. JORDAN, *Assistant Examiner.*